United States Patent
Kogoi et al.

(10) Patent No.: US 7,067,105 B2
(45) Date of Patent: Jun. 27, 2006

(54) ALUMINA PARTICLES, PRODUCTION PROCESS THEREOF, COMPOSITION COMPRISING THE PARTICLES AND ALUMINA SLURRY FOR POLISHING

(75) Inventors: Hisao Kogoi, Toyama (JP); Jun Tanaka, Toyama (JP); Hayato Yamaya, Gose (JP)

(73) Assignee: Showa Denko K.K., Tokyo (JP)

( * ) Notice: Subject to any disclaimer, the term of this patent is extended or adjusted under 35 U.S.C. 154(b) by 457 days.

(21) Appl. No.: 10/179,268

(22) Filed: Jun. 26, 2002

(65) Prior Publication Data

US 2003/0064020 A1  Apr. 3, 2003

Related U.S. Application Data

(63) Continuation-in-part of application No. 09/891,456, filed on Jun. 27, 2001, now abandoned, and a continuation-in-part of application No. PCT/JP00/09231, filed on Dec. 26, 2000.

(60) Provisional application No. 60/214,795, filed on Jun. 28, 2000.

(30) Foreign Application Priority Data

Dec. 27, 1999  (JP)  ................................. 11-369555

(51) Int. Cl.
*C01F 7/00*  (2006.01)

(52) U.S. Cl. ...................................... 423/625; 423/135

(58) Field of Classification Search ................ 423/625, 423/135
See application file for complete search history.

(56) References Cited

U.S. PATENT DOCUMENTS

| | | | |
|---|---|---|---|
| 3,663,283 A | | 5/1972 | Hebert et al. |
| 5,061,474 A | | 10/1991 | Pauli et al. |
| 5,424,258 A | * | 6/1995 | Mangold et al. ............ 501/128 |
| 5,527,423 A | | 6/1996 | Neville et al. |

FOREIGN PATENT DOCUMENTS

| | | |
|---|---|---|
| GB | 1 229 042 | 4/1971 |
| JP | 47-21212 | 6/1972 |
| JP | 57-145026 | 9/1982 |
| JP | 4-193712 | 7/1992 |
| JP | 5-53722 | 8/1993 |
| JP | 8-197414 | 8/1996 |
| JP | 11-228132 | 8/1999 |
| JP | 11-268911 | 10/1999 |
| WO | WO 99/35089 | 7/1999 |

OTHER PUBLICATIONS

International Search Report for PCT/JP00/09231, Mar. 2001.

* cited by examiner

*Primary Examiner*—Steven Bos
(74) *Attorney, Agent, or Firm*—Sughrue Mion, PLLC

(57) ABSTRACT

A process for producing alumina particles, comprising vaporizing aluminum chloride to form an aluminum chloride vaporized gas, which optionally contains an inert gas, and oxidizing the vaporized aluminum chloride with an oxidizing gas to produce alumina particles, wherein the aluminum chloride vaporized gas and the oxidizing gas are introduced into a reactor each at an ejecting flow velocity of about 10 m/sec or more, the ratio of the flow velocity of oxidizing gas to the flow velocity of the aluminum chloride vaporized gas is approximately from 0.2 to less than 10, and the amount of oxidizing gas is about 1 or more times the amount of oxidizing gas necessary for stoichiometrically oxidizing aluminum chloride.

5 Claims, 1 Drawing Sheet

ALUMINA PARTICLES, PRODUCTION PROCESS THEREOF, COMPOSITION COMPRISING THE PARTICLES AND ALUMINA SLURRY FOR POLISHING

CROSS REFERENCE TO RELATED APPLICATIONS

This application is a continuation-in-part (CIP) application under 35 U.S.C. §120 of U.S. patent application Ser. No. 09/891,456 filed on Jun. 27, 2001 now abandoned and PCT/JP00/09231 filed on Dec. 26, 2000 and designating U.S., claiming benefit pursuant to 35 U.S.C. §119(e)(1) of the filing date of the Provisional Application No. 60/214,795 filed on Jun. 28, 2000 pursuant to 35 U.S.C. §111(b).

TECHNICAL FIELD

The present invention relates to alumina particles obtained using a gas phase method, a process for producing the alumina particles, and a composition comprising the particles. The alumina particles are obtainable from aluminum chloride by the gas phase method, and are suitable for use as a slurry for polishing.

BACKGROUND ART

Aluminum oxide (alumina) has various crystalline forms such as γ-, δ-, θ-, and α-forms. The α-alumina is widely used as a raw material for fine ceramics in most general use. The γ-, δ-, and θ-aluminas other than the α-alumina are low-temperature phases of the α-alumina. They are referred to as transition alumina and used for catalyst carriers, various kinds of fillers, and modifiers for modifying Theological properties.

To produce the transition alumina, there is a process of calcining aluminum hydroxide, aluminum alkoxide, or alum, followed by grinding. Calcination of aluminum hydroxide, aluminum alkoxide, and alum can remove water, alcohol, and ammonium sulfate respectively therefrom, thereby providing alumina. In the above process, the particle properties of the raw material and the calcining conditions strongly influence the primary particle diameter and the secondary particle diameter of alumina obtained as the resulting product. Therefore, in order to control the primary and secondary particle diameters, it is important to pay attention to the properties of the raw particles, specifically, to appropriately select the raw materials. The step of grinding the calcined powder often becomes indispensable for regulating the particle size.

Further, as examples of the process for obtaining the transition alumina by synthesizing a raw material in a liquid phase and calcining the raw material, the following processes are known: a process for obtaining γ-alumina by preparing basic aluminum ammonium carbonate in a liquid phase and calcining the basic aluminum ammonium carbonate (Japanese Laid-Open Patent Application No. 11-228132); a process of gelling a basic aluminum chloride aqueous solution by pH adjustment and sintering the resulting gelled product (Japanese Laid-Open Patent Application No. 11-228131); and a process of sintering and grinding hydrated alumina with a boehmite structure (Japanese Laid-Open Patent Application No. 11-268911).

In addition to the above, there is a process for obtaining the transition alumina by a gas phase method, for example, a process for obtaining an ultrafine oxide by melting and vaporizing a metal in a vacuum vessel, and introducing the vaporized metal into an oxidizing atmosphere; a process of evaporating and oxidizing a metal aluminum powder in an oxygen-containing flame (Japanese Patent Publication No. 5-53722); and a process of ejecting a metal halide represented by anhydrous aluminum chloride into a burner flame to oxidize the same (Japanese Laid-Open Patent Application No. 8-197414). The transition alumina particles produced by such gas phase methods have a lower aggregation degree as compared with those of transition alumina produced through a liquid phase, or have a nearly spherical shape and are in almost a monodispersed state.

Recently, there has been a tendency for more and more increase in the degree of integration of circuits provided on a semiconductor substrate. The technique of chemical mechanical polishing (CMP) is attracting special attention as a method for increasing the degree of integration. In this technique, circuit formation on a substrate and smoothing of the substrate by polishing are alternately carried out to make a multi-layered circuit, thereby increasing the degree of integration. A slurry used for the CMP comprises an aqueous solvent of which the liquid properties are adjusted with an oxidizing metallic salt, a surfactant or the like, and inorganic particles uniformly suspended in the solvent. The aqueous solvent chemically reacts with the surface subjected to polishing, and the compounds present on the surface subjected to polishing are scraped away by the mechanical abrasiveness of the inorganic particles. Therefore, the inorganic particles are required to efficiently work to scrape away the compounds with a measure of hardness and to include neither coarse particles nor particles with extremely high hardness, as both types of particles would cause scratches on the surface subjected to polishing.

The transition alumina prepared through the sintering step includes a large number of coarse particles. It is difficult to decrease the number of coarse particles in order to cope with the CMP even if grinding is insistently conducted. Further, variance in sintering in the particles is unavoidable, and it is therefore highly probable that particles with high hardness are mixed in. Meanwhile, when the particles produced by the gas phase method are spherical or nearly spherical, the frictional force of the particles against the surface subjected to polishing becomes low and, consequently, the abrasiveness is decreased. In order to improve the abrasiveness, it is better for the primary particles or secondary particles to be large. However, scattering in the particle size distribution is unavoidable in light of the properties of the particles, so that no particles with a completely uniform particle size exist. On this account, with the increase in size of the primary particles or the secondary particles, the probability that coarse particles are contained is drastically increased, with the result that the occurrence of scratches becomes frequent. The above-mentioned Japanese Laid-Open Patent Application No. 8-197414 discloses fumed alumina produced by a gas phase method. However, the previously mentioned points are not taken into consideration, and the production process is not disclosed.

SUMMARY OF THE INVENTION

The object of the present invention is to provide alumina particles with excellent abrasiveness, containing small amounts of coarse particles to such a degree that the alumina particles are suitable as abrasive grains for CMP, a process for producing the alumina particles, and a composition and an alumina slurry for polishing, each comprising the alumina particles.

The present inventors have intensively studied and succeeded in obtaining alumina particles capable of solving the above-mentioned problems by controlling the manufacturing conditions such as mixing of gases and the reaction temperature in the production process of alumina where aluminum chloride serving as a raw material is vaporized and thereafter allowed to react with an oxidizing gas.

Namely, the present invention basically provides the following:

(1) Alumina particles obtained from aluminum chloride by a gas phase method, the alumina having an amorphous form or being an alumina having a crystalline form of transition alumina, with primary particles thereof having an average particle diameter of approximately 5 to 100 nm, and secondary particles, resulting from the aggregation of the primary particles, having an average particle diameter of approximately 50 to 800 nm.

(2) Alumina particles obtained from aluminum chloride by a gas phase method, the particles having an amorphous form or a γ, δ, or θ crystalline form or a mixed form thereof, with primary particles thereof having an average particle diameter of approximately 5 to 100 nm, and secondary particles, resulting from the aggregation of the primary particles, having an average particle diameter of approximately 50 to 800 nm.

(3) The alumina particles as described in (1) or (2) above, wherein particles having a particle diameter larger than 45 μm are contained in an amount of about 0.05% by mass or less.

(4) A process for producing alumina particles, comprising vaporizing aluminum chloride and high-temperature oxidizing the vaporized aluminum chloride with an oxidizing gas to produce alumina particles as described in any one of (1) to (3) above.

(5) The process for producing alumina particles as described in (4) above, wherein the aluminum chloride vaporized gas and the oxidizing gas are preheated to 500° C. or more before the high-temperature oxidation.

(6) The process for producing alumina particles as described in any one of (1) to (4) above, wherein the aluminum chloride-containing gas (material gas) and the oxidizing gas are introduced into a reactor each at an ejecting flow velocity of about 10 m/sec or more, the ratio of the flow velocity of oxidizing gas to the flow velocity of material gas is approximately from 0.2 to less than 10, and the amount of oxidizing gas is about 1 or more times the amount of oxidizing gas necessary for stoichiometrically oxidizing aluminum chloride.

(7) The process for producing alumina particles as described in any one of (4) to (6) above, wherein the vaporized aluminum chloride gas contains approximately from 5 to 90% by volume of aluminum chloride.

(8) The process for producing alumina particles as described in any one of (4) to (7) above, wherein the ratio of oxygen to water vapor in the oxidizing gas is from 0 to about 90% by volume of oxygen to from about 10 to 100% by volume of water vapor and the sum total of oxygen and water vapor is from about 10 to 100% by volume.

(9) The process for producing alumina particles as described in any one of (4) to (8) above, wherein the high-temperature oxidation is performed with a reactor residence time of about 1 sec or less.

(10) Alumina particles obtained by the production process of alumina particles described in any one of (4) to (9) above.

(11) A composition comprising alumina particles described in any one of (1) to (3) and (10) above.

(12) An alumina slurry for polishing, comprising alumina particles described in any one of (1) to (3) and (10) above.

BEST MODES FOR CARRYING OUT THE INVENTION

Figure 1:
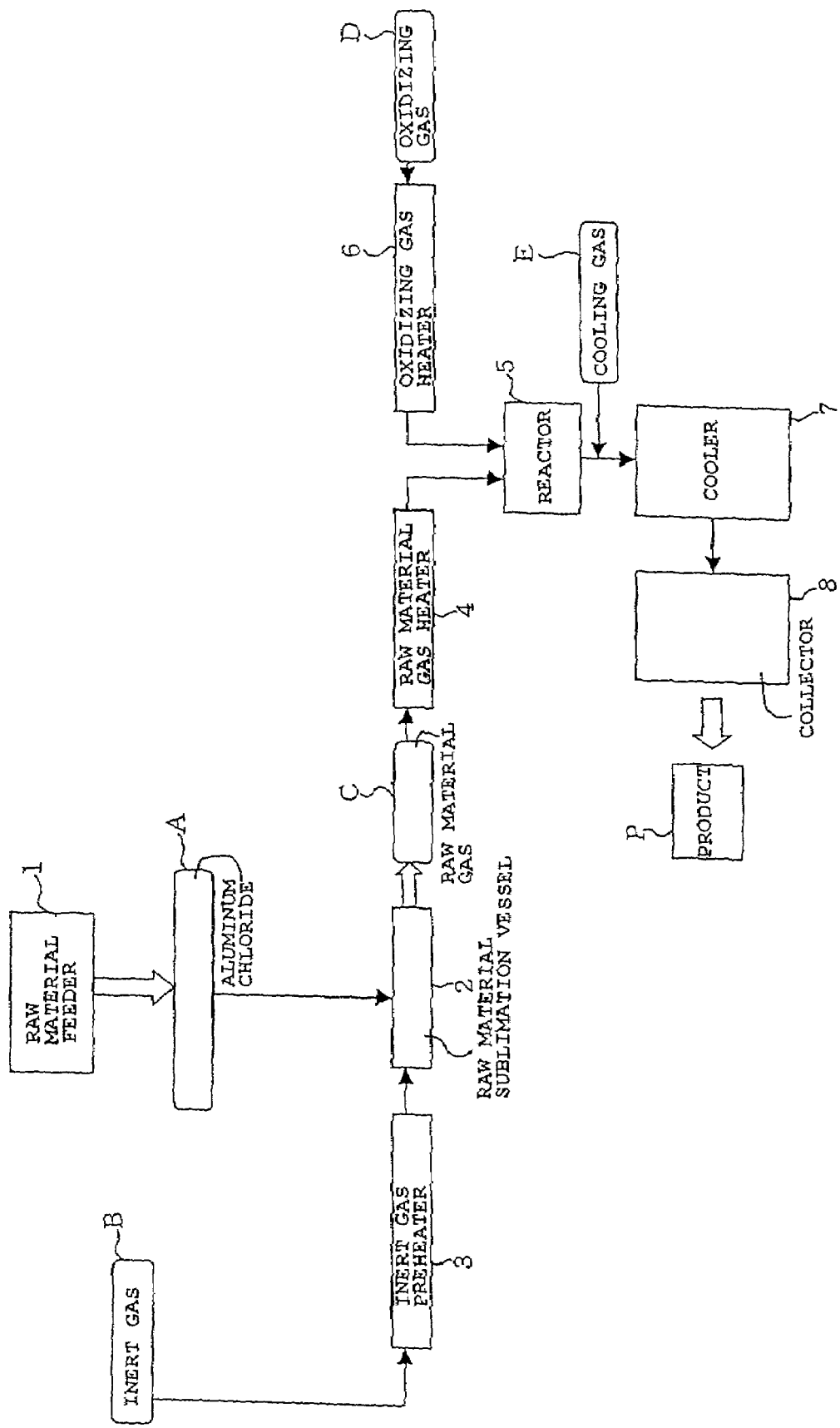
FIG. 1 is a block diagram showing one example of a system flow which is suitably used for the production of alumina particles of the present invention.

One embodiment of the present invention is described in detail below by referring to the attached drawing, however, the present invention is not limited to this embodiment.

FIG. 1 shows one example of a system flow which is suitably used for the production of alumina particles of the present invention. The system structure comprises a raw material feeder 1, a raw material sublimation vessel 2, an inert gas preheater 3, a material gas heater 4, an oxidizing gas heater 5, a reactor 6, a cooler 7 and a product collector 8.

The production of alumina particles of the present invention is briefly described below. Aluminum chloride A is fed to the raw material sublimation vessel 2 by the raw material feeder 1. Simultaneously, the inert gas B is preheated by the inert gas preheater 3 and then fed to the raw material sublimation vessel 2. The material gas C generated from the raw material sublimation vessel 2 is subsequently introduced into the material gas heater 4. The raw material sublimation vessel 2 and the material gas heater 4 may be integrated into one body. The thus-heated material gas C containing aluminum chloride gas is introduced into the reactor 5. On the other hand, the oxidizing gas D is heated by the oxidizing gas heater 6 and then introduced into the reactor 5. After the aluminum chloride is completely oxidized in the reactor 5, a large quantity of cooling gas E is introduced into the cooler 7 to forcibly terminate the reaction. The reaction product is collected using a collector 8 such as bag filter, thereby obtaining a product P. The exhaust gas is fed to an exhaust gas treating apparatus (not shown).

The alumina particles of the present invention are obtained by vaporizing the raw material aluminum chloride and oxidizing the vaporized aluminum chloride using an oxidizing gas by a gas phase method. The resultant alumina is an amorphous alumina or a transition alumina which can have any of the crystalline forms, for example, γ-form, δ-form, and θ-form.

These particles are composed of particles with different particle diameters. The average primary particle diameter is approximately from 5 to 100 nm, and the primary particles are loosely aggregated to form the secondary particles with an average particle diameter of approximately 50 to 800 nm. The average primary particle diameter herein used is a particle diameter converted from a specific surface area measured by a BET method, namely, an average particle diameter calculated using a specific surface area measured by a BET single point method (according to JIS R1626), and the average secondary particle diameter is an average particle diameter determined by a laser Doppler type particle size measuring apparatus. The procedure of measuring the particle size distribution is described below. 50 ml of pure water and 100 μl of an aqueous 10% sodium hexametaphosphate solution are added to 0.05 g of alumina particles and on the obtained slurry, ultrasonic waves (46 KHz, 65 W) are irradiated for 3 minutes. The resulting slurry is subjected to the measurement of particle size distribution in a laser diffraction-type particle size distribution measuring device ("SALD-2000J", manufactured by Shimadzu Corporation). From the thus-measured particle size distribution, the average secondary particle size may be calculated. When the average primary particle diameter is less than about 5 nm and/or the average secondary particle diameter is less than about 50 nm, the abrasiveness is insufficient. When the average primary particle diameter exceeds about 100 nm and the average secondary particle diameter exceeds about 800 nm, the occurrence of scratches becomes frequent in the course of polishing.

The reason why the alumina particles of the present invention are suitable for CMP has not been clarified. However, it is presumed that the polishing rate can be very effectively accelerated due to the fact that the primary particle diameters or the secondary particle diameters are appropriately large and the particles have a complicated shape resulting from the aggregation. With regard to the particles that cause the scratches, it is considered that when the alumina particles of the present invention have average particle diameters within the above-mentioned ranges, coarse particles, if included, are easily disintegrated by the pressure applied thereto in the polishing operation because the primary particles are loosely aggregated to constitute the secondary particles. Although the coarse particles can be disintegrated, it is preferable to reduce the amount of such coarse particles. For example, 50 g of the powder is added to 0.3 liter of pure water, and the resultant mixture is stirred and dispersed by the application of ultrasonic waves thereto for 2 minutes to prepare a slurry, followed by classifying with a sieve. In this case, it is preferable that particles having a diameter of 45 μm or more (above 45 μm mesh) be contained in an amount of about 0.05 mass % or less. It is considered that the loose aggregation of the primary particles is inherent in the particles produced by the gas phase method according to the present invention. Further, the alumina of the present invention is amorphous, or γ, δ, or θ-form, and it is considered that the hardness of the particle itself is lower than that of α-alumina particle, so that scratches are scarcely produced.

As described above, the alumina particles of the present invention are obtained by subjecting an aluminum chloride gas to high temperature oxidation using an oxidizing gas. The aluminum chloride (usually, aluminum chloride anhydrous) serving as a raw material for the aluminum chloride gas is in a powdered state at room temperatures, and is introduced into a raw material sublimation vessel 2 and gasified.

At this time, the aluminum chloride gas may be diluted with a diluting gas. The diluting gas must be selected from those incapable of reacting with aluminum chloride and free of oxidation. An inert gas B is preferably used as a carrier gas. This inert gas B also functions as a sealing gas at the time of introducing raw materials. Examples of the inert gas B include nitrogen, helium and argon, but the inert gas is not limited thereto. For efficient gasification of aluminum chloride A, the inert gas B may be preheated before introducing it to the raw material sublimation vessel 2. The temperature at the preheating of inert gas B is about 30° C. or more, preferably about 50° C. or more, more preferably about 200° C. or more. The preheating temperature difference is preferably as small as possible, however, the preheating temperature may be selected from the range of not exceeding about 300° C. according to the objective particle size.

The inert gas is introduced into the raw material sublimation vessel 2 so that the ratio of $AlCl_3/(AlCl_3+inert\ gas)$ is approximately from 5 to 90% by volume, preferably from about 5 to about 80% by volume, more preferably from about 7 to about 80% by volume. This concentration is closely related to the productivity and therefore, is a factor for controlling the particle diameter of alumina primary particles. More specifically, with an aluminum chloride ($AlCl_3$) concentration of approximately 5 to 90% by volume, a large number of uniform nuclei are generated or the reactivity increases, as a result, the formation of particles grown under the CVD governance is hindered and the obtained particles can have a narrow particle size distribution.

Subsequently, the aluminum chloride gas, optionally comprising the inert gas, in other words, the material gas C, is introduced into a material gas heater 4 connected to the raw material sublimation vessel 2 and heated. For heating, a glass or ceramic heater is used. Further, by filling the material gas heater 4 with a heat transfer medium, the heat transfer to the material gas C can be more efficiently promoted. As the heat transfer medium, heat-resistant materials such as ceramics and glass, in particular, quartz glass and alumina ceramics are preferable. In view of the heat transfer efficiency, it is preferable that the medium be in the shape of a circular ring, mesh ring, honeycomb, or Rasching ring. The amount of heat transfer medium with which the heater is filled is determined in consideration of thermal expansion and pressure loss. The diameter and the length of the heater are determined so that the temperature of the material gas at the ejecting port of the material gas heater 4 is preferably about 500° C. or more, and more preferably about 600° C. or more. The upper limit of the material gas temperature is about 1,300° C. If this preheating temperature is less than about 500° C., uniform nuclei are scarcely generated and the reactivity is low, as a result, the obtained aluminum particles have a broad particle size distribution. The preheating temperature may be sufficient if it is lower than the reaction temperature described below.

It is preferable that a heater 6 for the oxidizing gas has the same structure as the material gas heater 4. The oxidizing gas means oxygen, water vapor, or a mixed gas comprising oxygen and water vapor. The temperature at the ejecting port is preferably about 500° C. or more, and more preferably about 600° C. or more. The upper limit of the temperature is the same as that of the material gas. If this peheating temperature is less than about 500° C., uniform nuclei are scarcely generated and the reactivity is low and, as a result, the obtained aluminum particles have a broad particle size distribution. The preheating temperature may be sufficient if it is lower than the reaction temperature described below.

An oxidizing gas B having a composition of 0 to about 90% by volume of oxygen and about 10 to 100% by volume of water vapor, with the total amount of oxygen and water vapor being in the range of about 10 to 100% by volume, is usually employed. In the case where the sum of oxygen and water vapor does not reach 100%, the residual gas is a non-oxidizing gas such as nitrogen. Water vapor is used because water vapor has been found to very effectively accelerate the oxidation of the aluminum chloride gas.

The ratio of the amount of material gas C to oxidizing gas D is determined so that the flow velocity ratio of gases ejected from the nozzles, that is, the ratio of the flow velocity of the oxidizing gas to the flow velocity of the material gas, may range approximately from 0.2 to less than 10, preferably from about 0.2 to less than about 5, more preferably from about 0.3 to less than about 2. If this flow velocity ratio between gases is less than about 0.2, the gas flow in the reactor 5 has a conspicuous partiality and aluminum chloride is generated and deposited on the wall surface of the reactor 5 or in the collector 8, causing choking of the reactor 5 or collector 8 or contamination of the resulting product. If the flow velocity ratio is about 10 or more, the flow velocity of material gas and the flow velocity of oxidizing gas are in bad balance and therefore, the oxidizing gas having a high flow velocity enters the nozzle side of ejecting the material gas having a low flow velocity and reacts in the vicinity of the nozzle to generate scaling and thereby cause choking of the nozzle.

At the same time, the ratio of the amount between the gases is determined so that the ejecting flow velocity of each gas is about 10 m/sec or more, preferably about 20 to about 200 m/sec, more preferably about 30 to about 150 m/sec, and that the oxidizing gas is in an amount of 1 or more times, preferably about 1 to about 10 times, more preferably about 1 to about 4 times, the amount that is stoichiometrically required to oxidize the aluminum chloride. The gas flow velocity is calculated from the flow rate, the temperature, and the ejection area of the nozzle.

The material gas C and the oxidizing gas D are introduced into a reactor 5. As long as each of the gas compositions is as previously defined and the amount ratio of the gases is within the above-mentioned range, the oxidation smoothly proceeds using any of the gas introducing systems such as parallel flow system, counter flow system, crossed flow system, and oblique flow system. In particular, it is preferable that the ejecting port for introduction employs a coaxial parallel flow system using a coaxial double nozzle with an internal tube for the material gas, and an external tube for the oxidizing gas.

In any case, to prevent the resultant product from being contaminated with aluminum chloride, the amount of oxidizing gas D must be set to the same or greater than the stoichiometric amount required to oxidize aluminum chloride.

The size of the reactor 5 is determined so that the reactor residence time is preferably about 1 second or less, more preferably about 0.1 second or less, still more preferably about 0.07 second or less. The reactor residence time is obtained by calculating the amount of gas generated after the oxidation reaction from the flow rate of gas introduced into the reactor 5, at standard state, and dividing the calculated amount of gas by the volume of the reactor 5. The residence time is closely related to the characteristics of alumina particles, namely, the secondary particle diameter, and therefore, the particle size can be appropriately changed by varying the residence time. However, the residence time over 1 second is not preferable because the secondary particle diameter becomes too large, thereby increasing the number of coarse particles.

The reactor 5 for use in the present invention may have any shape. A cylindrical form is advantageous in view of the prevention of scaling and deposition. The material for the reactor is determined by taking account of the heat resistance at the time of performing the oxidation reaction of the aluminum chloride gas and the corrosion resistance against the oxidizing gas atmosphere. Preferable examples of the material are metallic titanium, graphite (water-cooled), and quartz glass. The oxidation reaction of the aluminum chloride gas proceeds in the high-temperature reactor 5.

In the present invention, the flow velocity of gas introduced into the reaction tube is preferably high so as to completely mix the gases in the reaction tube and, more preferably about 5 m/sec or more in terms of the average flow velocity. With a gas flow velocity of about 5 m/sec or more in the reaction tube, thorough mixing can be attained in the reaction tube, as a result, the formation of particles grown under the CVD governance is reduced and the produced particles can be prevented from having a broad particle size distribution.

After the oxidation reaction, rapid cooling becomes necessary to control the particle size of the secondary particles. To be more specific, a method of introducing a gas obtained after the reaction into a cooler 7 connected to the reactor 5 is adopted, with a cooling gas E being supplied to the cooler 7. Air or nitrogen is used as the cooling gas E, and such a cooling gas is blown into the cooler 7 so that the average gas temperature in the cooler 7 is approximately from 100 to 450° C., preferably from about 100 to about 400° C., more preferably from about 100 to about 350° C. The lower the average gas temperature the better. However, this necessitates large quantities of cooling gas, so that the above-mentioned gas temperature range is suitable when the prevention of moisture condensation in the gas is also taken into consideration. The alumina particles are inhibited from growing in this way, and are collected using a collector 8 such as bag filter. Simultaneously, exhaust gas is discharged from the collector 8 and sent to an exhaust gas treating apparatus (not shown). The primary particle diameter and the secondary particle diameter of the alumina particles can be controlled by changing the temperatures of the material gas C and the oxidizing gas D, the concentration of the material gas, the reactor residence time, and the flow velocities of the gases, ejected into the reactor 5.

The alumina particles collected by the collector 8 such as a bag filter may be heated to reduce the content of chlorine (Cl). For this purpose, an electric furnace or externally heated rotary kiln may be used. In this case, the heating temperature is approximately from 150 to 850° C., preferably from about 150 to about 550° C., more preferably from about 200 to about 500° C. If the heating temperature is less than about 150° C., chlorine cannot be satisfactorily removed, whereas if it exceeds about 850° C., the quality of alumina product disadvantageously decreases.

By employing the manufacturing conditions and the system structure as described above, it is possible to continuously provide alumina particles having a primary particle diameter approximately of 5 to 100 nm and a secondary particle diameter of approximately 50 to 800 nm, with an amorphous, $\gamma$-, $\delta$-, or $\theta$-crystalline form.

The alumina particles can be prepared as a slurry suitable for polishing the semiconductor substrate or the like by dispersing the alumina particles in water, with the addition thereto of a pH adjustor and a polishing accelerator in accordance with the conventional process. Further, a composition is prepared by mixing the alumina particles, an organic solvent (for example, an alcohol or a ketone), and the like. The composition may be used as a coating agent for paper or the like.

EXAMPLES

The present invention will be explained with reference to the following examples and comparative example, but the present invention is not intended to be limited by the examples.

Evaluation of Polishing

1) Polishing Method

A polishing slurry was prepared by dissolving 3.5 mass % of iron nitrate nonahydrate (a guaranteed reagent produced by Kanto Chemical Co., Inc.) in water to prepare an aqueous solution, and uniformly dispersing 2 mass % of alumina particles in the aqueous solution. The abrasiveness is evaluated in terms of the polishing rate, the selecting ratio, and the presence of scratches. The selecting ratio is a ratio of the polishing rate of a metal subjected to polishing, such as tungsten, to the polishing rate of an insulating film for which polishing is not desirable. As this ratio is larger, the performance of the polishing slurry is higher because the metal is polished and the insulating film is not polished.

2) Evaluation of Polishing Rate

The polishing rate was evaluated by the following procedure. Five tungsten plates each having a diameter of 20 mm and a thickness of 5 mm (purity of 99.9 mass %) were attached to a glass substrate having a diameter of 110 mm and a thickness of 5 mm to prepare a work material to be subjected to polishing. The polishing pad used was a semiconductor device-polishing two-layered pad ("IC1000/Suba400" manufactured by RODEL NITTA Company). The polishing machine used was a single-side polishing machine with a surface table having a diameter of 320 mm, "Model 7941-338" manufactured by Marumoto Kogyo K. K. The polishing was performed at 60 rpm by the application of a 39.2 kPa pressure while feeding the polishing slurry at a rate of 10 ml/min. After the polishing was performed under such conditions for 15 minutes, the polishing rate was calculated in terms of the thickness from the weight change of the work material.

3) Evaluation of Selecting Ratio

A thermally oxidized film formed on a silicon substrate was subjected to polishing and the polishing rate was obtained. From the polishing rate of the silicon substrate and the polishing rate of the above-described tungsten plate, the selecting ratio was calculated. The thermally oxidized film formed on a silicon wafer with a diameter of 6 inches and a thickness of 625 μm was subjected to polishing, using a semiconductor device-polishing two-layered pad ("IC1000/Suba400" manufactured by RODEL NITTA Company) as the polishing pad. The polishing machine used was a semiconductor device-polishing single-side polishing machine having a surface table with a diameter of 320 mm, "Model SH-24" manufactured by SpeedFam Co., Ltd. The polishing was performed at 30 rpm by the application of a 39.2 kPa pressure while feeding the polishing slurry at a rate of 10 ml/min. After the polishing was performed under such conditions for 1 minute, the polishing rate was calculated using a light interference film thickness gauge.

4) Evaluation of Scratches

The evaluation of scratches was performed on five levels by counting the number of scratches in 10 visual fields through observation under a differential interference microscope (at a magnification of 50 times). The evaluation criteria are as follows.

1: The number of scratches was 0 to 1.
2: The number of scratches was 2 to 10.
3: The number of scratches was 10 to 50.
4: The number of scratches was 50 to 100.
5: The number of scratches was 100 or more.

Example 1

Using 9.4 Nm$^3$/hr ("N" means standard state) of a nitrogen gas heated at 500° C. as a carrier gas, anhydrous aluminum chloride was fed to a raw material sublimation vessel at a flow rate of 51 kg/hr. A gas comprising the aluminum chloride gas generated from the sublimation vessel was introduced into a heater. This heater was an externally heated type heater and filled with siliceous stone. The temperature of the material gas obtained in the heater was 850° C. when measured at an ejecting port to a reactor. The concentration of raw material was 48% by volume and the ejecting flow velocity was 83 m/sec.

Separately, 68 Nm$^3$/hr in total of an oxidizing gas comprising 95% by volume of water vapor and 5% by volume of oxygen was heated by an externally heated type heater. The heater was filled with siliceous stone. The temperature of the heated oxidizing gas was 850° C. when measured at an ejecting port to the reactor. The ejecting flow velocity was 34 m/sec. These two gases were ejected into the reactor by a coaxial double tube parallel flow system, and the ratio of the flow velocity of the oxidizing gas to the flow velocity of the material gas was 0.41. The average residence time was 0.3 seconds in the reactor. Immediately after the gas passed the outlet of the reactor, the gas temperature was lowered to 300° C. or less by blowing air at room temperature. The alumina particles collected thereafter by a bag filter were γ-alumina having an average primary particle diameter of 45 nm and an average secondary particle diameter of 300 nm. When this alumina was fractionated by wet sieving with a mesh size of 45 μm, the remaining particles above sieve amounted to 0.005 mass %. The polishing properties of the obtained alumina particles were evaluated. The polishing rate of tungsten was 7,100 Å/min, the selecting ratio was 510, and the presence of scratches was evaluated as level 2.

Example 2

Using 11.4 Nm$^3$/hr of a nitrogen gas heated at 500° C. as a carrier gas, aluminum chloride anhydrous was fed to a raw material sublimation vessel at a flow rate of 47 kg/hr. A gas comprising the aluminum chloride gas generated from the sublimation vessel was introduced into a heater. This heater was an externally heated type heater and filled with siliceous stone. The temperature of the material gas obtained in the heater was 830° C. when measured at an ejecting port to a reactor. The concentration of raw material was 41% by volume and the ejecting flow velocity was 72 m/sec.

Separately, 118 Nm$^3$/hr of an oxidizing gas comprising 100% by volume of water vapor was heated by an externally heated type heater. The heater was filled with siliceous stone. The temperature of the heated oxidizing gas was 835° C. when measured at an ejecting port to the reactor. The ejecting flow velocity was 179 m/sec. These two gases were ejected into the reactor by a coaxial double tube parallel flow system, and the ratio of the flow velocity of the oxidizing gas to the flow velocity of the material gas was 2.5. The average residence time was 0.04 seconds in the reactor. Immediately after the gas passed the outlet of the reactor, the gas temperature was lowered to 300° C. or less by blowing air at room temperature. The alumina particles collected thereafter by a bag filter were γ-alumina having an average primary particle diameter of 30 nm and an average secondary particle diameter of 150 nm. When this alumina was fractionated by wet sieving with a mesh size of 45 μm, the remaining particles above mesh amounted to 0.002 mass %. The polishing properties of the obtained alumina particles were evaluated. The polishing rate of tungsten was 5,300 Å/min, the selecting ratio was 420, and the presence of scratches was evaluated as in level 1.

Example 3

Using 11.4 Nm$^3$/hr of a nitrogen gas heated at 500° C. as a carrier gas, anhydrous aluminum chloride was fed to a raw material sublimation vessel at a flow rate of 47 kg/hr. A gas comprising the aluminum chloride gas generated from the sublimation vessel was introduced into a heater. This heater was an externally heated type heater and filled with siliceous stone. The temperature of the material gas obtained in the heater was 830° C. when measured at an ejecting port to a reactor. The concentration of raw material was 41% by volume and the ejecting flow velocity was 72 m/sec.

Separately, 148 Nm³/hr in total of an oxidizing gas comprising 80% by volume of water vapor and 20% by volume of oxygen was heated by an externally heated type heater. The heater was filled with siliceous stone. The temperature of the heated oxidizing gas was 830° C. when measured at an ejecting port to the reactor. The ejecting flow velocity was 200 m/sec. These two gases were ejected into the reactor by a coaxial double tube parallel flow system, and the ratio of the flow velocity of the oxidizing gas to the flow velocity of the material gas was 2.8. The average residence time was 0.03 seconds in the reactor. Immediately after the gas passed the outlet of the reactor, the gas temperature was lowered to 300° C. or less by blowing air at room temperature. The alumina particles collected thereafter by a bag filter were γ-alumina having an average primary particle diameter of 20 nm and an average secondary particle diameter of 80 nm. When this alumina was fractionated by wet sieving with a mesh size of 45 μm, the remaining particles above sieve amounted to 0.006 mass %. The polishing properties of the obtained alumina particles were evaluated. The polishing rate of tungsten was 5200 Å/min, the selecting ratio was 460, and the presence of scratches was evaluated as level 2.

Example 4

Using 31 Nm³/hr of a nitrogen gas heated at 500° C. as a carrier gas, anhydrous aluminum chloride was fed to a raw material sublimation vessel at a flow rate of 43 kg/hr. A gas comprising the aluminum chloride gas generated from the sublimation vessel was introduced into a heater. This heater was an externally heated type heater and filled with siliceous stone. The temperature of the material gas obtained in the heater was 800° C. when measured at an ejecting port to a reactor. The concentration of raw material was 19% by volume and the ejecting flow velocity was 150 m/sec.

Separately, 118 Nm³/hr in total of an oxidizing gas comprising 60% by volume of water vapor and 40% by volume of oxygen was heated by an externally heated type heater. The heater was filled with siliceous stone. The temperature of the heated oxidizing gas was 800° C. when measured at an ejecting port of the reactor. The ejecting flow velocity was 90 m/sec. These two gases were ejected into the reactor by a coaxial double tube parallel flow system, and the ratio of the flow velocity of the oxidizing gas to the flow velocity of the material gas was 0.60. The average residence time was 0.02 seconds in the reactor. Immediately after the gas passed the outlet of the reactor, the gas temperature was lowered to 300° C. or less by blowing air at room temperature. The alumina particles collected thereafter by a bag filter were amorphous alumina having an average primary particle diameter of 15 nm and an average secondary particle diameter of 70 nm. When this alumina was fractionated by wet sieving with a mesh size of 45 μm, the remaining particles above sieve amounted to 0.003 mass %. The polishing properties of the obtained alumina particles were evaluated. The polishing rate of tungsten was 4,000 Å/min, the selecting ratio was 560, and the presence of scratches was evaluated as level 1.

Example 5

Using 30 Nm³/hr of a nitrogen gas heated at 500° C. as a carrier gas, anhydrous aluminum chloride was fed to a raw material sublimation vessel at a flow rate of 45 kg/hr. A gas comprising the aluminum chloride gas generated from the raw material sublimation vessel was introduced into a material gas heater. This material gas heater was an externally heated type heater and filled with a lump of an alumina sintered body. The temperature of the material gas obtained in the heater was 800° C. when measured at an ejecting port to a reactor. The concentration of raw material was 20% by volume and the ejecting flow velocity was 143 m/sec.

Separately, 450 Nm³/hr of an oxidizing gas comprising 100% by volume of water vapor was heated by an externally heated type oxidizing gas heater. The oxidizing gas heater was filled with a lump of an alumina sintered body. The temperature of the heated oxidizing gas was 880° C. when measured at an ejecting port of the reactor. The ejecting flow velocity was 127 m/sec. These two gases were ejected into the reactor by a coaxial double tube parallel flow system, and the ratio of the flow velocity of the oxidizing gas to the flow velocity of the material gas was 1.1. The average residence time was 0.01 second in the reactor. Immediately after the gas passed the outlet of the reactor, the gas temperature was lowered to 300° C. or less by blowing air at room temperature. The alumina particles collected thereafter by a bag filter were γ-alumina having an average primary particle diameter of 12 nm and an average secondary particle diameter of 300 nm. When this alumina was fractionated by wet sieving with a mesh size of 45 μm, the remaining particles above sieve amounted to 0.005 mass %. To 100 g of this alumina, 900 g of an aqueous solution comprising 40 mass of polyvinyl alcohol (124H, produced by Kuraray) was added and the resulting slurry was milled in a homomixer (T.K ROBOMIX, manufactured by Tokushu Kika Kogyo K.K.) at 11,000 rpm for 30 minutes to prepare a coating solution. This coating solution was coated on a resin coated paper by a bar coater to a dry thickness of 20 μm and then dried. The coating film was free of generation of cracks even after the drying. Using a color printer (BJC-465J, manufactured by Canon Inc.), the obtained recording paper was subjected to a printing test, as a result, the ink absorptivity and color formation property both were very excellent. The same test was performed except for changing the substrate to polyethylene terephthalate film (100 μm, produced by Toray Industries, Inc.), as a result, the coating film further had good transparency.

Example 6

Using 11.4 Nm³/hr of a nitrogen gas heated at 500° C. as a carrier gas, aluminum chloride anhydrous was fed to a raw material sublimation vessel at a flow rate of 47 kg/hr. A gas comprising the aluminum chloride gas generated from the raw material sublimation vessel was introduced into a material gas heater. This material gas heater was an externally heated type heater and filled with a lump of alumina sintered body. The temperature of the material gas obtained in the heater was 830° C. when measured at an ejecting port to a reactor. The concentration of raw material was 41% by volume and the ejecting flow velocity was 72 m/sec.

Separately, 118 Nm³/hr of an oxidizing gas comprising 100% by volume of water vapor was heated by an externally heated type oxidizing gas heater. The oxidizing gas heater was filled with a lump of an alumina sintered body. The temperature of the heated oxidizing gas was 835° C. when measured at an ejecting port to the reactor. The ejecting flow velocity was 179 m/sec. These two gases were ejected into the reactor by a coaxial double tube parallel flow system, and the ratio of the flow velocity of the oxidizing gas to the flow velocity of the material gas was 2.5. The average residence time was 0.04 seconds in the reactor. Immediately after the gas passed the outlet of the reactor, the gas temperature was lowered to 300° C. or less by blowing air at room temperature. The alumina particles collected thereafter by a bag filter were γ-alumina having an average primary particle diameter of 30 nm and an average secondary particle diameter of 150 nm. When this alumina was fractionated by wet sieving with a mesh size of 45 μm, the remaining particles above sieve amounted to 0.002 mass %. The obtained alumina particles were mixed with a water-absorbing resin powder mainly comprising sodium polyacrylate having an average particle diameter of 500 μm. The mixing ratio was 0.3 mass % based on the mass of water-absorbing resin powder. The resulting mixed powder was left standing in a thermo-hygrostat at 35° C. and a relative humidity of 90% for 24 hours and thereafter, the state was examined. As a result, it was found that the resin was not fused.

Comparative Example 1

Alum was calcined in an electric furnace to obtain γ-alumina (80 m$^2$/g). The obtained γ-alumina particles had an average primary particle diameter of 25 nm and an average secondary particle diameter of 5 μm. The alumina particles were subjected to wet milling using a ball mill and alumina ball as the grinding medium, and then allowed to stand for classification. The obtained alumina was γ-alumina having an average primary particle diameter of 25 nm and an average secondary particle diameter of 900 nm. When the γ-alumina was fractionated by wet sieving with a mesh size of 45 μm, the remaining particles above sieve amounted to 0.6 mass %. The polishing properties of the obtained alumina were evaluated. The polishing rate of tungsten was 4,200 Å/min, the selecting ratio was 120, and the presence of scratches was evaluated as level 4.

Comparative Example 2

Aluminum hydroxide with a bayerite crystalline form having an average secondary particle diameter of 40 μm was sintered to obtain θ-alumina. The θ-alumina particles were subjected to wet milling using a ball mill and an alumina ball as the grinding medium, and were then allowed to stand for classification. The obtained alumina was θ-alumina having an average primary particle diameter of 35 nm and an average secondary particle diameter of 1,500 nm. When this alumina was fractionated by wet sieving with a mesh size of 45 μm, the remaining particles above sieve amounted to 0.8 mass %. The polishing properties of the obtained alumina were evaluated. The polishing rate of tungsten was 5,100 Å/min, the selecting ratio was 310, and the presence of scratches was evaluated as level 5.

The preparation conditions and the properties of the products obtained in Examples 1 to 4 and Comparative Examples 1 and 2 are shown in Table 1 and the preparation conditions and the properties of the products obtained in Examples 5 and 6 are shown in Table 2.

TABLE 1

| | Example 1 | Example 2 | Example 3 | Example 4 | Comparative Example 1 | Comparative Example 2 |
|---|---|---|---|---|---|---|
| Material Gas | | | | | | |
| Flow velocity of nitrogen gas (Nm$^3$/hr) | 9.4 | 11.4 | 11.4 | 31 | Alum was calcined in an electric oven and wet milled by aluminum balls, followed by being placed and classified. | Bayerite aluminum hydroxide with an average secondary particle size of 40 μm was fired to obtain θ-alumina, which was wet milled with alumina balls, followed by being placed and classified. |
| Temperature (° C.) | 500 | 500 | 500 | 500 | | |
| Flow velocity of raw material (kg/hr) | 51 | 47 | 47 | 43 | | |
| Concentration of raw material (% by volume) | 48 | 41 | 41 | 19 | | |
| Gas temperature (at the ejecting port) | 850 | 830 | 830 | 800 | | |
| Ejecting flow velocity (m/sec) | 83 | 72 | 72 | 150 | | |
| Oxidizing Gas | | | | | | |
| Composition water vapor (% by volume) | 95 | 100 | 80 | 60 | | |
| oxygen (% by volume) | 5 | 0 | 20 | 40 | | |
| Flow velocity (Nm$^3$/hr) | 68 | 118 | 148 | 118 | | |
| Gas temperature (at the ejecting port) | 850 | 835 | 830 | 800 | | |
| Ejecting flow velocity (m/sec) | 34 | 179 | 200 | 90 | | |
| Ratio of (flow velocity of oxidizing gas)/(flow velocity of material gas) | 0.41 | 2.5 | 2.8 | 0.60 | | |
| Average residence time (sec) | 0.3 | 0.04 | 0.03 | 0.02 | | |
| Alumina | | | | | | |
| Crystalline form | γ | γ | γ | amorphous | γ | θ |
| Average primary particle diameter (nm) | 45 | 30 | 20 | 15 | 25 | 35 |
| Average secondary particle diameter (nm) | 300 | 150 | 80 | 70 | 700 | 1500 |
| Above sieve after fractionation by wet sieving with mesh size of 45 μm (mass %) | 0.005 | 0.002 | 0.006 | 0.003 | 0.06 | 0.8 |

TABLE 1-continued

|  | Example 1 | Example 2 | Example 3 | Example 4 | Comparative Example 1 | Comparative Example 2 |
|---|---|---|---|---|---|---|
| Tungsten polishing rate (Å/min) | 7100 | 5300 | 5200 | 4000 | 4200 | 5100 |
| Selecting ratio | 510 | 420 | 460 | 560 | 120 | 310 |
| Evaluation of scratches | 2 | 1 | 2 | 1 | 4 | 5 |

TABLE 2

|  | Example 5 | Example 5 |
|---|---|---|
| Material Gas |  |  |
| Flow velocity of nitrogen gas (Nm$^3$/hr) | 30 | 11.4 |
| Temperature (° C.) | 500 | 500 |
| Flow velocity of raw material (kg/hr) | 45 | 47 |
| Concentration of raw material (% by volume) | 20 | 41 |
| Gas temperature (at the ejecting port) (° C.) | 800 | 830 |
| Ejecting flow velocity (m/sec) | 143 | 72 |
| Oxidizing Gas |  |  |
| Composition water vapor (% by volume) | 100 | 100 |
| oxygen (% by volume) | 0 | 0 |
| Flow velocity (Nm$^3$/hr) | 450 | 118 |
| Gas temperature (at the ejecting port) (° C.) | 880 | 835 |
| Ejecting flow velocity (m/sec) | 127 | 179 |
| Ratio of (flow velocity of oxidizing gas)/(flow velocity of material gas) | 0.1 | 1.5 |
| Average residence time (sec) | 0.01 | 0.04 |
| Alumina |  |  |
| Crystalline form | γ | γ |
| Average primary particle diameter (nm) | 12 | 30 |
| Average secondary particle diameter (nm) | 300 | 150 |
| Above sieve after fractionation by wet sieving with mesh size of 45 μm (mass %) | 0.005 | 0.002 |
| Generation of cracks in coating film (20 μm) after drying | None | — |
| Ink absorptivity | good | — |
| Color formation of ink | good | — |
| State after a mixture with water-absorbing resin powder mainly comprising sodium fusion polyacrylate having an average particle size of 500 μm (mixing ratio: 0.3 mass %) was left standing at 35° C. and a relative humidity of 90% for 24 hours | — | No resin fusion was found |

INDUSTRIAL APPLICABILITY

In the alumina particles of the present invention, the primary particles are loosely aggregated to form the secondary particles. The alumina of the present invention is an amorphous alumina with a relatively low hardness, or a transition alumina. Therefore, the alumina particles can be used for not only the CMP application, but also the cosmetics application where scrubbing and smooth feeling both are desired. Further, fine primary particles are aggregated properly, so that the alumina particles are also provided with adsorptivity of chemical substances. On this account, when the alumina particles are used as a coating solution for a substrate such as paper or polymer film, an excellent recording medium can be obtained, where the color of the substrate is not affected due to transparency and blurring of ink does not occur because of good ink absorptivity. Furthermore, the alumina particles of the present invention are favorably used as substitutes for conventional active alumina.

According to the present invention, the above-described alumina particles can be continuously produced with stable quality by industrial mass-production scale, so that the production process is considered to have a great practical value.

The present invention can also be practiced according to other specific embodiments without departing from its essential feature. Accordingly, it is intended that the above-described embodiment is illustrative in all points and not restrictive, the scope of the present invention is limited not by this detailed description but rather by the claims appended hereto, and all modifications within the scope and equivalence of the appended claims are included within the scope of present invention.

The invention claimed is:

1. A process for producing alumina particles, comprising vaporizing aluminum chloride to form an aluminum chloride vaporized gas, which optionally contains an inert gas, and oxidizing the vaporized aluminum chloride with an oxidizing gas to produce alumina particles, wherein the aluminum chloride vaporized gas and the oxidizing gas are introduced into a reactor each at an ejecting flow velocity of about 10 m/sec or more, the ratio of the flow velocity of oxidizing gas to the flow velocity of the aluminum chloride vaporized gas is approximately from 0.2 to less than 10, and the amount of oxidizing gas is about 1 or more times the amount of oxidizing gas necessary for stoichiometrically oxidizing aluminum chloride.

2. The process for producing alumina particles as claimed in claim 1, wherein the aluminum chloride vaporized gas and the oxidizing gas are preheated to about 500° C. or more before the oxidation.

3. The process for producing alumina particles as claimed in claim 1, wherein the aluminum chloride vaporized gas contains approximately from 5 to 90% by volume of aluminum chloride.

4. The process for producing alumina particles as claimed in claim 1, wherein the oxidizing gas, has a composition of 0 to about 90% by volume of oxygen and about 10 to 100% by volume of water vapor, and the sum total of oxygen and water vapor is from about 10 to 100% by volume.

5. The process for producing alumina particles as claimed in claim 1, wherein the oxidation is performed with a reactor residence time of about 1 sec or less.

* * * * *